United States Patent [19]

Savoca et al.

[11] Patent Number: 4,902,763

[45] Date of Patent: Feb. 20, 1990

[54] PROCESS FOR THE POLYMERIZATION TRI-SUBSTITUTED SILYLALKYNES

[75] Inventors: Ann C. Savoca, Reading; Michael Langsam, Allentown, both of Pa.

[73] Assignee: Air Products and Chemicals, Inc., Allentown, Pa.

[21] Appl. No.: 199,566

[22] Filed: May 27, 1988

[51] Int. Cl.$^4$ .............................................. C08L 238/00
[52] U.S. Cl. ..................................... 526/240; 526/279; 526/90
[58] Field of Search ......................................... 526/240

[56] References Cited

U.S. PATENT DOCUMENTS

| 4,657,564 | 4/1987 | Langsam | 55/16 |
| 4,759,776 | 7/1988 | Langsam et al. | 526/240 |

FOREIGN PATENT DOCUMENTS 2135319A 8/1984 United Kingdom .

OTHER PUBLICATIONS

T. Masuda et al., "Synthesis of High Polymers from Substituted Acetylenes: Exploitation of Molybdenum- and Tungsten-Based Catalysts", Acc. Chem. Res., vol. 17, pp. 51–56 (1984).

T. Masuda et al., "Polymerization of 1-(Trimethylsilyl)-1-Propyne by Halides of Niobium(V) and Tantalum(V) and Polymer Properties", Macromolecules, vol. 18, No. 5, pp. 841–845 (1985).

T. Masuda et al., "Polymerization of Methylpentynes by Transition Metal Catalysts: Monomer Structure, Reactivity, and Polymer Properties", Polymer Journal, vol. 4, No. 5, pp. 371–377 (1982).

*Primary Examiner*—Joseph L. Schofer
*Assistant Examiner*—Bernard Lipman
*Attorney, Agent, or Firm*—Mark L. Rodgers; William F. Marsh; James C. Simmons

[57] ABSTRACT

Polymeric trisubstituted silylalkynes useful for forming gas separation membranes are prepared at accelerated polymerization rates and with improved yields in the presence of a Group VV or VIB Metal halide catalyst such as $TaCl_5$, by employing about 0.1 to 5 mole %, based upon total alkyne concentration, of a trialkylgermylalkyne compound.

8 Claims, No Drawings

PROCESS FOR THE POLYMERIZATION TRI-SUBSTITUTED SILYLALKYNES

TECHNICAL FIELD OF THE INVENTION

The present invention relates to an improvement in a process for the preparation of polymeric tri-substituted silylalkynes which may be cast into membrane from and used to separate components of a gas mixture.

BACKGROUND OF THE INVENTION

The preparation of polymeric tri-substituted silylalkynes employing an organic solvent and a suitable catalyst such as $TaCl_5$, $MoCl_5$, $NbCl_5$ or other Group VB or IVB metal halides is known, as is the formation of polymeric membranes and gas separation processes using the polymeric membranes.

The preparation of poly(trialkylsilylpropyne) and treated, semipermeable polymeric membranes comprising a polymer having the general structural formula:

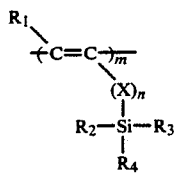

wherein $R_1$ is a linear or branched $C_1$–$C_4$ alkyl group; $R_2$ and $R_3$ are independently linear or branched $C_1$–$C_6$ alkyl groups; $R_4$ is a linear or branched $C_1$–$C_{12}$ alkyl group or aryl group; X is a $C_1$–$C_3$ alkyl group or phenyl; m is at least 100 and n is 0 or 1, is disclosed in the Langsam U.S. Pat. No. 4,657,564. These polymers are prepared from tri-substituted (silylalkynes), the polymerization method thereof being incorporated herein by reference.

G.B. patent application No. 2,135,319A discloses the polymerization of one or more 1-monoalkyl ($C_1$–$C_{12}$) dimethylsilylpropynes using various silylpropyne monomers in the presence of halides of transition metals of Group VB of the Periodic Table. Organo-aluminum compounds are described as co-catalysts.

The polymerization of 1-(trimethylsilyl)-1-propyne employing pentahalides of niobium and tantalum ina toluene solution at 80° C. along with the effects of solvents and temperature are described in an article by T. Masuda, et al. entitled "Polymerization of 1-(trimethylsilyl)-1-propyne by Halides of Niobium (V) and Tantalum (V) and Polymer Properties," Macromolecules Vol. 18, No. 5, pp. 841–845 (1985).

Molybdenum and other methyl halides are disclosed as catalysts for the polymerization of sterically hindered acetylenes and dialkyl-acetylenes in a solvent by T. Masuda, et al. in an article entitled," "Polymerization of Methylpentynes by Transition Metal Catalysts: Monomer Structure, Reactivity, and Polymer Properties" Polymer Journal, Vol. 4, No. 5, pp 371–377 (1982).

T. Masuda in an article entitled "Synthesis of High Polymers from Substituted Acetylenes: Exploitation of Molybdenum and Tungsten-Based Catalysts," Acc. Chem. Res., Vol 17, pp. 51–56 (1984) discloses the polymerization of aromatic and aliphatic acetylenes.

SUMMARY OF THE INVENTION

The present invention is based on the unexpected discovery that it is possible to increase the polymerization rate and conversion of trisubstituted silylalkynes, and especially trimethylsilylpropyne, in the presence of a Group VB or VIB metal halide catalyst, by employing about 0.1 to 5.0 mole %, based upon total alkyne concentration, of a trialkylgermylalkyne compound. The reaction is carried out at typical polymerization temperatures for such a reaction, and preferably in the presence of a suitable organic solvent.

It is a primary object of this invention to provide an improved process for the preparation of polymeric tri-substituted silylalkynes useful for casting into membrane form for separating gas components as described for example in U.S. Pat. No. 4,657,564.

This and other objects and advantages of this invention will become apparent from the description of the invention which follows, and from the claims.

DETAILED DESCRIPTION OF THE INVENTION

In accordance with the present invention a tri-substituted silylalkyne polymer having the general structural formula:

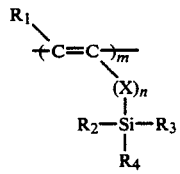

wherein $R_1$ is a linear or branched $C_1$–$C_4$ alkyl group; $R_2$ and $R_3$ are independently linear or branched $C_1$–$C_6$ alkyl groups; $R_4$ is a linear or branched $C_1$–$C_{12}$ alkyl group or aryl group; X is a $C_1$–$C_3$ alkyl group or phenyl; m is at least 100 and n is 0 or 1, is produced in an organic solvent solution at polymerization temperatures of from about 30° C. to about 100° C., preferably from about 50° C. to about 100° C. and more preferably from 70° C.to 90° C. in the presence of a Group VB or VIB metal halide catalyst and from about 0.1 to 5.0 mole %, based upon total alkyne concentration, of a trialkylgermylalkyne compound. The addition of a trialkylgermylalkyne compound to the reaction mixture accelerates the polymerization process and can also increase the conversion of trisubstituted silylalkyne monomer, even in the presence of impurities which heretofore impeded or inhibited polymer formation.

Generally, the rate of polymerization of a trisubstituted silylalkyne such as trimethylsilylpropyne is dependent on the input process parameters of polymerization temperature (Tp) and catalyst/monomer ratio (C/M). In order to increase the rate of polymerization according to prior art process systems one can either increase the polymerization temperature or increase the ratio of catalyst to monomer. Increasing the Tp and/or the C/M ratio will increase the rate of polymerization but typically results in a decrease in the molecular weight and intrinsic viscosity of the resultant polymer. Increasing both the Tp and the C/M ratio will also result in a reduction in the molecular weight of the polymer.

The conversion to polymer of a trisubstituted silylalkyne such as trimethylsilylpropyne in the presence of a Group V or VI metal halide catalyst is known to be extremely sensitive to monomer purity. Trace quantities of agents which can act as chain terminators (e.g., ethers, alcohols) will significantly reduce polymer yield if not impede polymerization altogether. As an example, the polymerization of high purity trimethylsilylpropyne (TMSP) in the presence of a catalytic amount of tantalum (V) chloride is near quantitative. However, in the presence of as little as 0.5% of a contaminant such as tetrahydrofuran (THF) the yield of polytrimethylsilylpropyne is reduced by at least 15%. At a level of 1.0% THF the polymerization of TMSP is completed inhibited.

Such rigid requirements for monomer purity necessitate tedious and often expensive purification procedures. In certain cases, it is not even possible to remove all traces of a deleterious impurity, particularly when its boiling point lies close to that of the monomer. Under such circumstances, the polymer yield will decrease with increasing amounts of residual contaminant.

It has now been found that by adding a small amount; i.e. between about 0.1 to 5.0 mole %, based upo total alkyne concentration, of a trialkylgermylalkyne compound, both the polymerization rate and conversion of trisubstituted silylalkynes can be significantly increased. The trialkylgermylalkyne compound which is added to the polymerization mixture is any compound having the general structural formula:

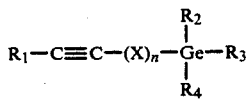

Wherein $R_1$ is H or a $C_1$-$C_2$ alkyl group; $R_2$ and $R_3$ are independently linear or branched $C_1$-$C_6$ alkyl groups; $R_4$ is a linear or branched $C_1$-$C_6$ alkyl or aryl group; X is a $C_1$-$C_3$ alkyl group or phenyl; and n is 0 or 1.

The trialkylgermylalkyne compound can be added independently to the reaction mixture, although in a preferred embodiment, it is initially mixed with the silylalkyne monomer and the mixture added to the catalyst and solvent system. The minimum germylalkyne concentration which must be added to significantly increased polymerization rate and monomer conversion is very low; i.e., about 0.1 mole % based on total alkyne concentration. Increasing the germylalkyne concentration increases both the polymerization rate and conversion, although maximum conversion (i.e., 100%) is reached at relatively lwo concentrations, typically less than 5 mole %. Additionally, the germylalkyne compound is incorporated into the polymer chain and if the resultant polymer is to be predominantly a poly(silylalkyne) polymer rather than a copolymer, the amount of germylalkyne additive should be kept low.

The exact mechanicism by which the trialkylgermylalkyne compound accelerates polymerization and increases monomer conversion has not yet been fully determined. Without being bound by theory, however, it is believed that the first step in Group V or VIB metal halide promoted trialkylsilylyne polymerization is the combination of monomer with one molar equivalent of metal to form a highly reactive intermediate. This intermediate then reacts further with remaining monomer to form the polymer chain. Certain monomer impurities, particularly ethers and alcohols, may very well compete with the monomer for reaction at the metal center. The uniqueness of the germlyne monomer lies in its apparent tendency to react rapidly with the metal halide salt to produce this reactive intermediate. In the presence of a germylyne additive then, preferably trimethylgermylpropyne, formation of the reactive intermediate is not adversely affected by hitherto deleterious impurities and polymerization is quantitative.

The polymerization procedure can be any suitable technique such as those described in the above-cited art. The improvements realized by the addition of a germylalkyne compound of the formula described above can be achieved using any conventional process conditions, including temperature and pressure. As with the prior art processes, the present process is preferably carried out in the presence of an organic solvent.

The organic solvents employed in the present invention may be any aromatic or substituted aromatic hydrocarbon solvents which are stable and chemically inert to the polymerization system and include, for example, benzene, toluene, xylene, chlorobenzenes, nitrobenzenes, nitrotoluenes, bromobenzenes and the like. Toluene is the preferred solvent for the polymerization system.

Experiments were carried out to demonstrate the novel effect such trialkylgermylalkyne compounds have on the conversion of trimethylsilylpropyne and on the molecular weight of the resultant polymer. These examples are provided to illustrate the invention in accordance with principles of the invention and include particular features of the invention. However, the examples are not to be construed as limiting the invention in any way, it being understood that numerous variations are possible without departing from the spirit and scope of the invention.

EXAMPLE 1

A series of runs were carried out in which hexamethyldisiloxane, a close boiling impurity typically found in commercial trimethylsilylpropyne (TMSP), was added in varying quantities to samples of high purity TMSP. Runs were also carried out in which tetrahydrofuran (THF) was added to high purity TMSP. The TMSP monomers containing various concentrations of impurities, were polymerized in the presence of a Group V or VI metal halide catalyst in accordance with the general procedure set out in G.B. Patent Application No. 2135 319 A. Polymerizations were carried out using only TMSP, with the added impurities, and also with the addition of trimethylgermylpropyne (TMGP) to provide for a direct comparison of the effect of the addition of a trialkylgermylpropyne compound on monomer conversion in the presence of trace amounts of impurities. The results of these runs are reported in Table 1 below.

TABLE 1

| IMPURITY | | POLYMER YIELD | |
|---|---|---|---|
| Type | Molar Equiv. | 100:0* | 98:2* |
| Me$_3$SiOSiMe$_3$ | 0.005 | 100% | 100% |
| | 0.010 | 100% | 100% |
| | 0.015 | 94% | 100% |
| | 0.050 | 72% | 100% |
| | 0.100 | 70% | 100% |
| THF | 0.005 | 83% | 96% |

*Moles TMSP:Moles TMGP

The results above show that when hexamethyldisiloxane (HMDS) contaminant is present with the TMSP, a decrease in polymer yield is observed at contaminant levels as low as 1.5% (0.015 Molar Equiv.), and a significant decrease is observed at as low as 5.0% contaminant concentration. However, when the above TMSP samples contained TMGP as well as HMDS, the polymerizations were quantitative at all levels of impurities tested. A concentration of only 0.5% THF significantly reduced the polymer yield, whereas the presence of TMGP along with the THF resulted in only a slight reduction in PTMSP yield.

EXAMPLE 2

Runs were carried out to polymerize commercial grade TMSP monomer obtained from Petrach Chemical Co. The polymerization was carried out in the presence of a catalyst prepared by dissolving 0.01 molar equivalent of Tantalum (v) chloride in toluene at room temperature under inert atmosphere. The monomer was added to the catalyst solution and polymerization occurred within seconds. The polymer was processed in methanol, redissolved in toluene, reprecipitated with methanol and vacuum dried at room temperature overnight. The molecular weight of the polymer was determined by intrinsic viscosity measurements. Runs were also carried out in accordance with this procedure using a 98:2 mixture of commercial TMSP monomer and trimethylgermylpropyne. The results of these runs are reported in Table 2 below.

TABLE 2

| Monomer Mixture TMSP:TMGP | Yield | n | Mw |
|---|---|---|---|
| 100:0 | 67% | 6.1 | 778,916 |
| 100:0 | 62% | 5.6 | 717,521 |
| 98:2 | 100% | 4.5 | 581,645 |
| 98:2 | 98% | 4.7 | 606,440 |

*As measured for solutions of the polymer in toluene at 30° C.

The results reported in Table 2 above show that while the molecular weight of the polymers made from only TMSP were higher than those made from the TMSP:TMGP mixture, the product yields were significantly lower. These results further point out the considerable effect a small amount of TMGP has on the conversion (yield) of such a polymerization reaction.

A study was done on the physical properties, such as tensile strength of the polymers, as well as on the permeability and gas separating properties of membranes fabricated from the resultant polymers. In each of these tests, the properties of the polymer did not appear to be adversely affected by the presence of the small amount of germanium in the polymer structure, and hence, such polymers should be able to be substituted for PTMSP homopolymers in any commercial application.

EXAMPLE 3

Several runs were carried out to determine the effect that TMGP has on the rate of polymrization of TMSP. The polymerization reactions were carried out in toluene using TaCl5 catalyst. The polymerization times for various TMSP:TMGP mixtures were measured and the results are reported in Table 3 below.

TABLE 3

| Mole % TMSP:TMGP | Polymerization Time* (SEC) |
|---|---|
| 100:0 | 15,000 |
| 98:2 | 33 |
| 95:5 | 16 |

*Time required to achieve a state of gelation such that stiring is impeded.

As can be seen from the above polymerization results, the presence of even a small amount of TMGP markedly accelerates the polymerization. This rapid polymerization allows for in-situ synthesis of thin film polymers which would be extremely difficult to make if only TMSP monomers are used.

The above results show that trace quantities of TMGP dramatically accelerate the polymerization of TMSP, and can also be employed as an additive to improve the conversion of impure TMSP to PTMSP. The present process offers a convenient alternative to expensive monomer purification procedures because impurities may be carried through the polymerization step without an adverse effect on product yield. The impurities are then easily separated from the resultant polymer with a methanol wash. As previously stated, incorporation of such a small amount of trimethylgermylpropyne into the polymer structure does not significantly change the properties of the polymer. Consequently, this technique can be applied to the polymerization of any yne-monomer in the presence of Group V or VIB metal halides.

Although the process of the present invention will be directed primarily to the polymerization of trimethylsilylpropyne in the presence of TaCl5, it is not intended that the process be limited to the particular silylalkyne or metal halide and those skilled in the art will recognize that the present invention is broadly applicable to the polymerization of other trisubstituted silylalkynes, within the formula as hereinabove set forth, as well as other Group VB and VIB metal halides, to produce other polymeric silylalkynes such as polymeric triethylsilylpropyne, tributylsilylpropyne, trimethylsilylbutyne and the like.

Having thus described the present invention, what is now deemed appropriate for Letters Patent is set out in the following appended claims.

What is claimed is:

1. In a process for the polymerization of trisubstituted silylalkyne in an organic solvent in the presence of a Group VB or VIB metal halide catalyst, to produce a polymer having the general structural formula:

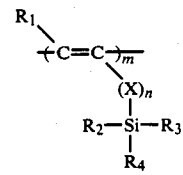

wherein $R_1$ is a linear or branched $C_1-C_4$ alkyl group; $R_2$ and $R_3$ are independently linear or branched $C_1-C_6$ alkyl groups; $R_4$ is a linear or branched $C_1-C_{12}$ alkyl group or aryl group; X is a $C_1-C_3$ alkyl group or phenyl; m is at least 100 and n is 0 or 1, the improvement for increasing the conversion and the rate of polymerization of the trisubstituted silylalkynes comprising: carrying out said polymerization in the presence of about 0.1 to 5.0 mole %, based upon total alkyne concentration, of a trialkylgermylalkyne compound.

2. A process according to claim 1 wherein said trialkylgermylalkyne compound has the general structural formula:

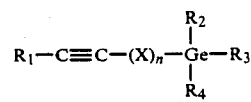

Wherein $R_1$ is H or a $C_1$–$C_2$ alkyl group; $R_2$ and $R_3$ are independently linear or branched $C_1$–$C_6$ alkyl groups; $R_4$ is a linear or branched $C_1$–$C_6$ alkyl or aryl group; X is a $C_1$–$C_3$ alkyl group or phenyl; and n is 0 or 1.

3. A process in accordance to claim 2 wherein said trialkylgermylalkyne is trimethylgermylpropyne.

4. A process in accordance with claim 2 wherein n is 0.

5. A process in accordance to claim 1 wherein the trisubstituted silylalkyne is trimethylsilylpropyne.

6. A process in accordance claim 1 wherein the metal halide catalyst is $TaCl_5$.

7. A process in accordance to claim 1 wherein the polymerization is carried out at a temperature is between about 30° C. and 100° C.

8. A process according to claim 1 wherein the organic solvent is toluene.

* * * * *